O. L. WHITEMAN.
GATE VALVE DISK.
APPLICATION FILED JULY 2, 1919.

1,323,941. Patented Dec. 2, 1919.

WITNESSES
Frederick Diehl.
J. C. Ledbetter

INVENTOR
O. L. Whiteman
BY
ATTORNEYS

UNITED STATES PATENT OFFICE.

OWEN L. WHITEMAN, OF COXSACKIE, NEW YORK.

GATE-VALVE DISK.

1,323,941.  Specification of Letters Patent.  Patented Dec. 2, 1919.

Application filed July 2, 1919.  Serial No. 308,256.

*To all whom it may concern:*

Be it known that I, OWEN L. WHITEMAN, a citizen of the United States, and a resident of Coxsackie, county of Greene, and State of New York, have invented a new and Improved Gate-Valve Disk, of which the following is a full, clear, and exact description.

This invention relates to valves, especially to gate valves. More particularly the invention relates to improvements in the closing mechanism of gate valves.

An object of the invention is to provide an effective form of gate valve simple in construction, inexpensive to manufacture, and unlikely to get out of working order; and particularly a valve which comprises few parts.

An object of the invention is to provide adequate means for raising and lowering gate sections into the valve seat within the valve casing in order to close the valve passage. A feature resides in an improved form of carrier for supporting the gate sections.

With the above and other objects in view, the invention has relation to a combination and arrangement of parts, an example of which is described in the following specification, pointed out in the appended claims, and illustrated in the accompanying drawings, wherein:

Figure 1:
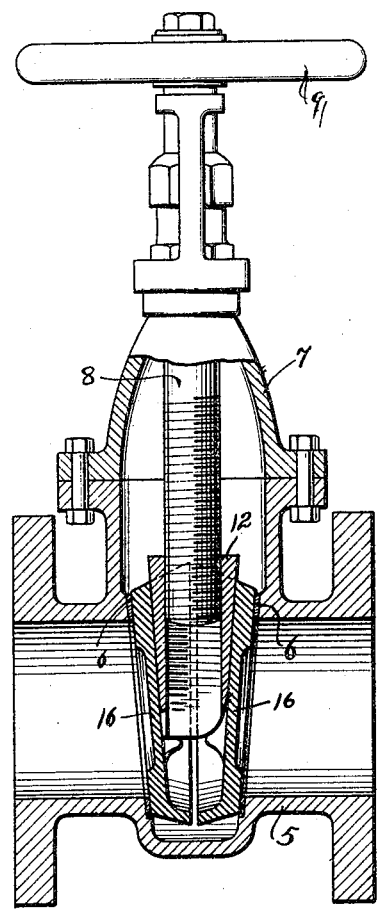
Figure 1 shows a longitudinal section of the valve.
Figure 3:
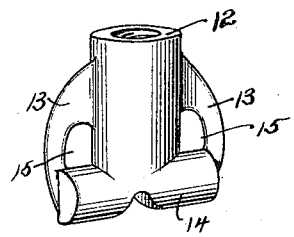
Fig. 3 shows a perspective view of the carrier for supporting the gate sections.
Figure 2:
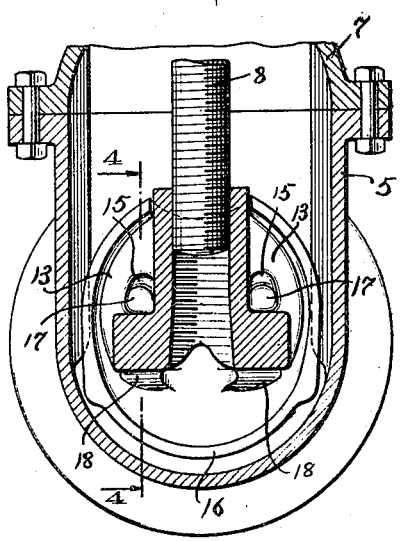
Fig. 2 shows a transverse sectional view of the valve.
Figure 4:
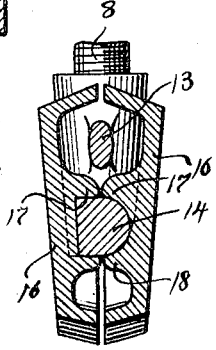
Fig. 4 is a sectional view upon the line 4—4 of Fig. 2.

Referring now more in particular to the drawings, the numeral 5 points out a valve casing with a passage therethrough and flanged at each end as is the usual practice in valves of similar design. The valve casing 5 is provided with a valve seat comprising two oppositely disposed faces, each face being provided with packing 6 to form liquid-tight joints.

The valve casing is provided with a cover 7, and this cover carries a valve stem 8 fitted with a hand-wheel 9. Revolving the hand-wheel rotates the stem 8, in suitable bearings of the cover 7. The lower end of the stem is threaded and screws into connection with a carrier block. This carrier block comprises a threaded barrel 12 with outstanding wings 13 and transverse lugs 14, all of which form a unitary element known as a carrier block. The wings 13 leave a hole or opening 15 between the barrel and each wing. The threaded stem is threaded into the carrier block and when the stem rotates the carrier block moves up and down on the stem.

A pair of opposed sliding gate sections 16 are disposed in the valve between the opposed valve seats. The gate sections are somewhat similar in design, and the outer face of each is finished to a seating fit to engage the valve seats 6. Each valve gate section 16 is provided with upper retaining bosses 17 and lower retaining bosses 18 which project inwardly from the face of the gate section. The bosses 17 register with the openings 15 of the carrier block, and the bosses 18 rest in position underneath said carrier block. The contour of the lug 14 and of the barrel is reproduced in the adjoining surface of the gate valve sections in order to provide a close fitting assembly of parts. The upper portion of each gate section has a little clearance between it and the barrel 12 in order that the gate sections may have a slight rocking or pivoting motion around the cylindrical lug 14. This permits each gate section to adjust itself to the surface of the valve seats, and causes each section to hunt the best seated position when driven under pressure against the valve seats. The bosses 17 and 18 act to carry the gate sections up and down when the stem is rotated. These bosses confine the carrier in position between the gate sections and prevent the sections and block from moving out of alinement one with the other.

The engaging faces of each gate section and the faces of each valve seat are disposed at an appropriate angle in order that the gate sections may be driven downwardly and expanded outwardly against the valve seats to form a close fitting joint between the valve casing 5 and the gate sections 16, thus effectually closing the opening through the valve casing 5.

Having thus described my invention, what I claim as new, and desire to secure by Letters-Patent is:

1. A gate valve comprising; a valve casing provided with a valve seat, a valve stem rotatably mounted in the valve casing, a barrel screw-threaded upon the valve stem, a lug formed on the barrel transversely thereto, and outspread wings joining each outer end of the lug with the upper portion of the barrel forming an opening between each wing and the barrel, gate sections associated with the recited parts, and retaining bosses formed on each section to register with the openings formed between the wings and the barrel.

2. A gate valve comprising; a valve casing provided with a valve seat, a valve stem rotatably mounted in the valve casing, a barrel screw-threaded upon the valve stem, a lug formed on the barrel transversely thereto, and outspread wings joining each outer end of the lug with the upper portion of the barrel forming an opening between each wing and the barrel, gate sections associated with the recited parts, retaining bosses formed on each section to register with the opening formed through the wings and barrel, and additional retaining bosses integrally made with the gate sections to engage the lug underneath thereof to confine the gate sections in position.

OWEN L. WHITEMAN.